United States Patent
Lee

(10) Patent No.: US 9,717,005 B2
(45) Date of Patent: Jul. 25, 2017

(54) SCHEMES FOR CONNECTING TO WIRELESS NETWORK

(71) Applicant: Empire Technology Development LLC, Wilmington, DE (US)

(72) Inventor: Hyoung-Gon Lee, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 492 days.

(21) Appl. No.: 13/885,754

(22) PCT Filed: Nov. 21, 2012

(86) PCT No.: PCT/US2012/066306
§ 371 (c)(1),
(2) Date: May 16, 2013

(87) PCT Pub. No.: WO2014/081427
PCT Pub. Date: May 30, 2014

(65) Prior Publication Data
US 2014/0140331 A1    May 22, 2014

(51) Int. Cl.
| | | |
|---|---|---|
| H04W 4/00 | (2009.01) |
| H04W 12/08 | (2009.01) |
| H04W 8/26 | (2009.01) |
| H04W 48/20 | (2009.01) |
| H04W 12/06 | (2009.01) |
| H04L 29/06 | (2006.01) |
| H04W 84/12 | (2009.01) |
| H04W 88/08 | (2009.01) |

(52) U.S. Cl.
CPC ............. *H04W 12/08* (2013.01); *H04L 63/10* (2013.01); *H04W 8/26* (2013.01); *H04W 12/06* (2013.01); *H04W 48/20* (2013.01); *H04W 84/12* (2013.01); *H04W 88/08* (2013.01)

(58) Field of Classification Search
CPC ....... H04W 8/26; H04W 48/20; H04W 12/06; H04W 84/12; H04W 88/08; H04W 12/08; H04L 63/10
See application file for complete search history.

(56) References Cited

U.S. PATENT DOCUMENTS

| | | |
|---|---|---|
| 7,185,204 B2 | 2/2007 | Narayanaswami et al. |
| 7,808,958 B1 | 10/2010 | Hernacki et al. |
| 8,005,458 B2 | 8/2011 | Baik et al. |
| 2003/0221006 A1 | 11/2003 | Kuan et al. |

(Continued)

OTHER PUBLICATIONS

International Search Report from International Application No. PCT/US12/66306 mailed Feb. 8, 2013.

(Continued)

*Primary Examiner* — Clemence Han
(74) *Attorney, Agent, or Firm* — Brundidge & Stanger, P.C.

(57) ABSTRACT

Technology is disclosed for preventing classification of objects, e.g., in an augmented reality system. The technology can identify a set of objects to be classified, determine whether context information for one or more objects in the identified set of objects to be classified is identified as not to be employed during classification, and during classification of two different objects, include context information for one object but not the other.

17 Claims, 6 Drawing Sheets

(56) References Cited

U.S. PATENT DOCUMENTS

| | | | |
|---|---|---|---|
| 2004/0264427 A1* | 12/2004 | Jaakkola | H04L 29/12009 370/338 |
| 2005/0059416 A1* | 3/2005 | Ono | 455/457 |
| 2006/0150250 A1* | 7/2006 | Lee | H04L 43/1416 726/23 |
| 2007/0060128 A1* | 3/2007 | Kil | H04W 88/08 455/436 |
| 2007/0097904 A1* | 5/2007 | Mukherjee | H04W 12/06 370/328 |
| 2007/0286143 A1 | 12/2007 | Olson et al. | |
| 2008/0043686 A1 | 2/2008 | Sperti et al. | |
| 2008/0052779 A1* | 2/2008 | Sinha et al. | 726/22 |
| 2009/0235077 A1* | 9/2009 | Cam Winget et al. | 713/171 |
| 2011/0083165 A1* | 4/2011 | Gopinath et al. | 726/4 |
| 2011/0314147 A1 | 12/2011 | Whelan et al. | |
| 2012/0064912 A1* | 3/2012 | Oh | 455/456.1 |
| 2012/0076072 A1* | 3/2012 | Jalfon | H04W 12/02 370/328 |
| 2012/0201201 A1* | 8/2012 | Liu | H04W 12/04 370/328 |
| 2012/0210395 A1* | 8/2012 | Cam Winget et al. | 726/3 |
| 2012/0221955 A1 | 8/2012 | Raleigh et al. | |
| 2012/0230304 A1* | 9/2012 | Barbu | H04W 48/18 370/338 |
| 2012/0311328 A1* | 12/2012 | Wang et al. | 713/168 |
| 2013/0150012 A1* | 6/2013 | Chhabra | H04W 48/16 455/418 |
| 2013/0176897 A1* | 7/2013 | Wang | H04W 12/06 370/254 |
| 2013/0179943 A1* | 7/2013 | Sun et al. | 726/3 |
| 2013/0281056 A1* | 10/2013 | Abraham et al. | 455/411 |
| 2013/0301617 A1* | 11/2013 | Kuhn et al. | 370/331 |

OTHER PUBLICATIONS

Singelee, et al., "Enabling Location Privacy in Wireless Personal Area Networks", 20 pages, 2006.

Gruteser, et al., "Enhancing Location Privacy in Wireless LAN Through Disposable Interface Identifiers: A Quantitative Analysis", Sep. 19, 2003, 10 pages.

* cited by examiner

| ACCESS POINT | MAC ADDRESS | SSID |
|---|---|---|
| AUTHENTICATED ACCESS POINT 1 | xxx111yyy | zzz |
| AUTHENTICATED ACCESS POINT 2 | zzz222xxx | yyy |
| ... | ... | ... |

US 9,717,005 B2

SCHEMES FOR CONNECTING TO WIRELESS NETWORK

CROSS-REFERENCE TO RELATED APPLICATION

This Application is the U.S. National Stage filing under 35 U.S.C. §371 of International Application Ser. No. PCT/US12/66306,filed on Nov. 21, 2012.

BACKGROUND

The availability of third generation (3G) and fourth generation (4G) mobile telecommunications technologies, and Wi-Fi wireless access technologies make it possible to provide wireless data communications. It is generally preferable to use Wi-Fi networks for data transmission because Wi-Fi wireless access technologies are typically available at lower cost but with higher throughput than the third generation (3G) and/or fourth generation (4G) mobile telecommunications technologies. However, security for Wi-Fi wireless access technologies has drawn intense scrutiny.

SUMMARY

In an example, a method performed under control of an end device first device may include transmitting a probe request frame including a fake device identifier for the end device to an access point, receiving a probe response frame including information regarding the access point from the access point, determining whether the access point is an authenticated access point based at least in part on the information regarding the access point, and transmitting a connection request including an authentic device identifier for the end device to the access point.

In another example, an end device may include a transmitting unit configured to transmit a probe request frame including a fake device identifier to an access point, a receiving unit configured to receive a probe response frame including information regarding the access point from the access point, a memory configured to store an authenticated access point list including information regarding at least one authenticated access point, a determination unit configured to determine whether the access point is an authenticated access point based at least in part on the information regarding the access point or the authenticated access point list, and a connecting unit configured to connect to a wireless local area network provided by the access point. The transmitting unit is further configured to transmit a connection request including an original device identifier to the access point, and the receiving unit is further configured to receive an approval of the connection request from the access point.

In yet another example, a computer-readable storage medium may store thereon computer-executable instructions that, in response to execution, cause an end device to perform operations, including transmitting a probe request frame including a fake device identifier of the end device to an access point, receiving a probe response frame including information regarding the access point from the access point, determining whether the access point is an authenticated access point based at least in part regarding the information regarding the access point, and transmitting a connection request including an original device identifier of the end device to the access point.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 2 schematically shows an illustrative example of an authenticated access point list, arranged in accordance with at least some embodiments described herein;

DETAILED DESCRIPTION

Figure 1:
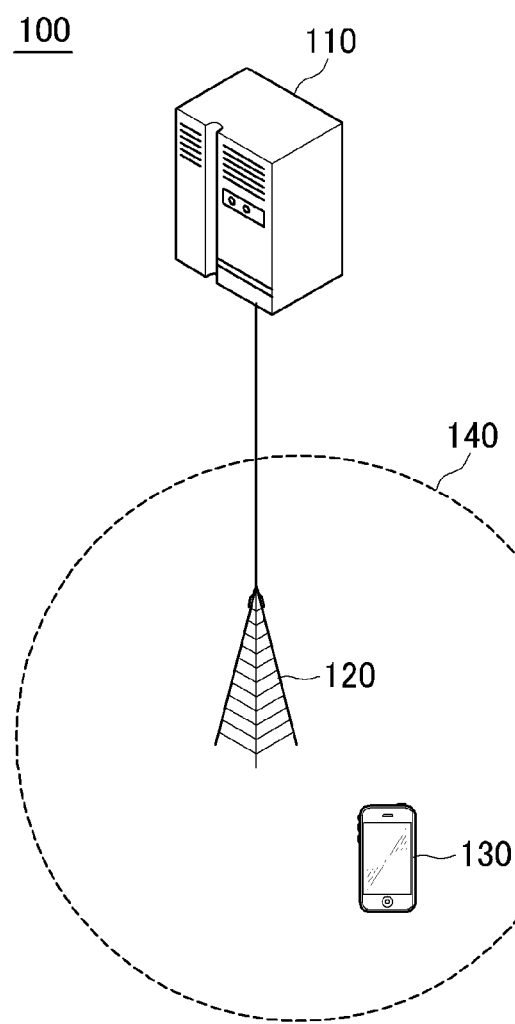
FIG. 1 schematically shows an illustrative example of a network communications environment including a mobile operating server, an access point and an end device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to secured wireless network communication schemes.

Technologies are generally described for connecting to wireless networks while preventing leakage of location information of an end device.

In general, in order to connect to a wireless local area network (WLAN), an end device may search for at least one available access point around the end device. By way of example, but not limitation, the access point may be a Wi-Fi access point and the WLAN may be a Wi-Fi network. When searching, the end device may transmit a probe request frame that may include a device identifier, for the end device such as a media access control (MAC) address of the end device. In such cases, since the probe request frame that includes the device identifier is transmitted to access points around the end device, present location information of the end device may be exposed to some access points with which a user of the end device does not want to be connected and/or other devices to which the end device does not want to disclose the present location information.

In some embodiments, an end device may transmit a probe request frame that includes a fake device identifier for the end device to at least one access point around the end device. As a response to the probe request frame, the end device may receive a probe response frame from one or more access points. The probe response frame may include information regarding the access point. By way of example, but not limitation, the information regarding the access point may include a MAC address of the access point and/or a service set identifier (SSID) of the access point.

The end device may determine whether there is an authenticated access point around the end device based at least in part on the information included in the probe response frame. If there is an authenticated access point around the end device, the end device may transmit a connection request including an authentic device identifier for the end device, such as an original MAC address, to the authenticated access point. Then, the end device may connect to a wireless local area network provided by the authenticated access point without a leakage of present location information of the end device to undesirable access points.

FIG. 1 schematically shows an illustrative example of a network communications environment 100 including a mobile operating server, an access point, and an end device, arranged in accordance with at least some embodiments described herein.

As illustrated in FIG. 1, network communications environment 100 may include a mobile operating server 110, an access point 120 and an end device 130. Mobile operating server 110 may control access point 120. In FIG. 1, although only one access point (i.e., access point 120) is located around end device 130, so that end device 130 is located in a network area 140 provided by access point 120, there could be two or more access points around end device 130.

By way of example, access point 120 may include a Wi-Fi access point and provide a WLAN that includes a Wi-Fi network. Further, by way of example, end device 130 may include, but not exclusively, a personal communication terminal, such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

End device 130 may transmit a probe request frame, which may include a fake device identifier (for example, a fake MAC address), to access point 120 for end device 130. By way of example, but not limitation, the fake device identifier may include one or both of one or more random numbers or one or more random characters. In some embodiments, end device 130 may generate the fake device identifier and transmit the generated fake device identifier to access point 120. Further, in some other embodiments, mobile operating server 110 may provide end device 130 with the fake device identifier, and end device 130 may transmit the provided fake device identifier to access point 120.

End device 130 may receive a probe response frame from access point 120 to which end device 130 transmitted the probe request frame. The probe response frame may include information regarding access point 120. By way of example, but not limitation, the information regarding access point 120 may include a MAC address of access point 120 and/or an SSID of access point 120.

End device 130 may determine whether access point 120, which transmitted the probe response frame to end device 130, is an authenticated access point based at least in part on the information regarding access point 120. In some embodiments, end device 130 may receive an authenticated access point list including information regarding at least one authenticated access point from mobile operating server 110. End device 130 may determine whether access point 120 is an authenticated access point based at least in part on the authenticated access point list. By way of example, end device 130 may check whether the information regarding access point 120 is included in the authenticated access point list. If the information regarding access point 120 is included in the authenticated access point list, end device 130 may recognize access point 120 as an authenticated access point. By way of example, but not limitation, the authenticated access point may include an access point controlled by mobile operating server 110 and/or an access point previously connected with end device 130.

FIG. 2 schematically shows an illustrative example of an authenticated access point list 200, arranged in accordance with at least some embodiments described herein. As illustrated in FIG. 2, authenticated access point list 200 may include the information regarding at least one authenticated access point. By way of example, but not limitation, the information regarding the least one authenticated access point may include a MAC address or an SSID of each authenticated access point.

Referring back to FIG. 1, end device 130 may transmit a connection request, including an authentic device identifier, to authenticated access point 120 for end device 130. By way of example, but not limitation, the authentic device identifier may include an original MAC address of end device 130. In some embodiments, the connection request may include an authentication request for authenticated access point 120 to authenticate end device 130. Further, the authentication request may include a shared key between access point 120 and end device 130.

End device 130 may receive an approval of the connection request from access point 120. In some embodiments, the approval of the connection request may include an authentication response.

End device 130 may transmit an association request to access point 120 in response to the approval of the connection request and, in response to the association request, access point 120 may transmit an association response to end device 130. Then, end device 130 may connect to the wireless local area network provided by access point 120.

Figure 3:
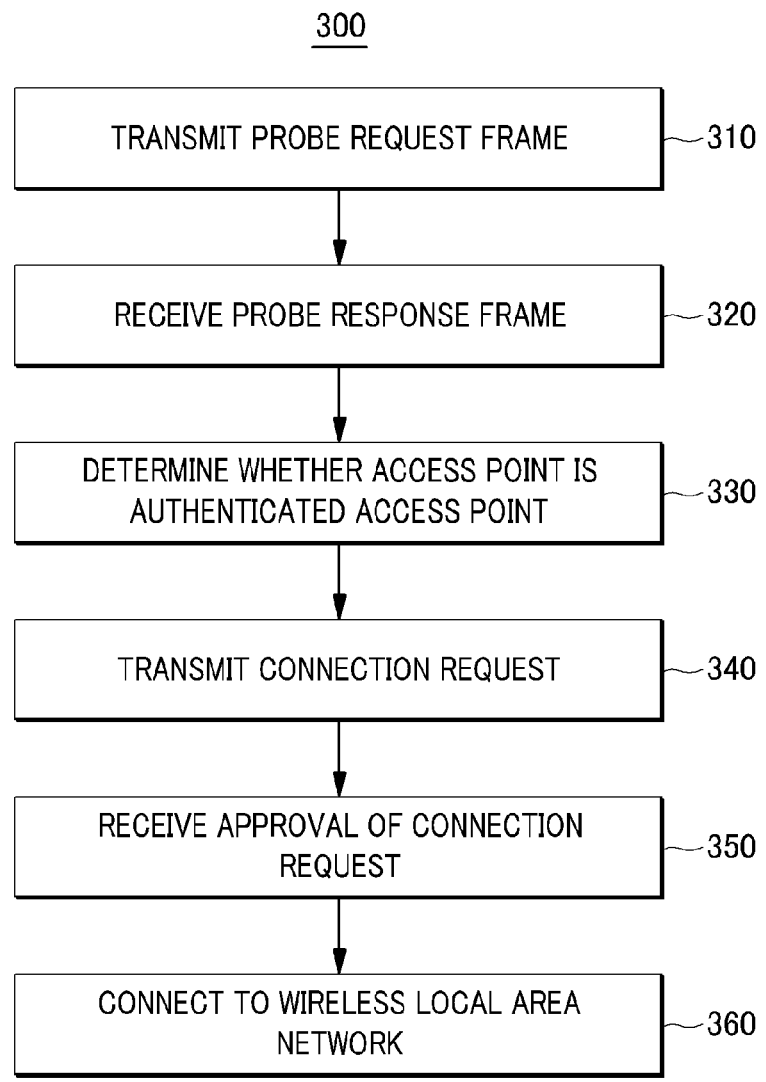
FIG. 3 shows an example flow diagram of a process of an end device for connecting to a wireless local area network, arranged in accordance with at least some embodiments described herein.

FIG. 3 shows an example flow diagram of a process 300 of an end device 130 for connecting to a wireless local area network, arranged in accordance with at least some embodiments described herein. The method in FIG. 3 may be implemented in the network communication environment including mobile operating server 110, access point 120 and end device 130, as illustrated in FIG. 1. An example process may include one or more operations, actions, or functions as illustrated by one or more blocks 310, 320, 330, 340, 350 and/or 360. Although illustrated as discrete blocks, various blocks may be divided into additional blocks, combined into fewer blocks, or eliminated, depending on the desired implementation. Processing may begin at block 310.

At block 310 (Transmit Probe Request Frame), end device 130 may transmit a probe request frame, which may include a fake device identifier (for example, a fake MAC address), to access point 120 for end device 130. By way of example, but not limitation, the fake device identifier may include at least one of a random number or a random character. Processing may proceed from block 310 to block 320.

At block 320 (Receive Probe Response Frame), end device 130 may receive a probe response frame from access point 120 as a response to the probe request frame. The probe response frame may include information regarding access point 120. By way of example, but not limitation, the information regarding access point 120 may include a MAC address of access point 120 and/or an SSID of access point 120. Processing may proceed from block 320 to block 330.

At block 330 (Determine Whether Access Point is Authenticated Access Point), end device 130 may determine whether access point 120, which transmitted the probe response frame to end device 130, is an authenticated access point based at least in part on the information regarding access point 120 included in the probe response frame. In some embodiments, end device 130 may receive authenticated access point list 200, as illustrated in FIG. 2, from mobile operating server 110. Authenticated access point list 200 may include information regarding at least one authenticated access point.

At block 330, end device 130 may check whether the information regarding access point 120, which is included in the probe response frame, is included in authenticated access point list 200. If the information regarding access point 120 is included in authenticated access point list 200, end device 130 may recognize access point 120 as an authenticated access point. Processing may proceed from block 330 to block 340.

At block 340 (Transmit Connection Request), end device 130 may transmit a connection request including an authentic device identifier for end device 130 to access point 120 which is recognized as the authenticated access point at block 330. By way of example, but not limitation, the authentic device identifier may include an original MAC address of end device 130. Processing may proceed from block 340 to block 350.

At block 350 (Receive Approval of Connection Request), end device 130 may receive an approval of the connection request from access point 120. Processing may proceed from block 350 to block 360.

At block 360 (Connect to Wireless Local Area Network), end device 130 may connect to a wireless local area network provided by access point 120. By way of example, but not limitation, the wireless local area network provided by access point 120 may include a Wi-Fi network.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
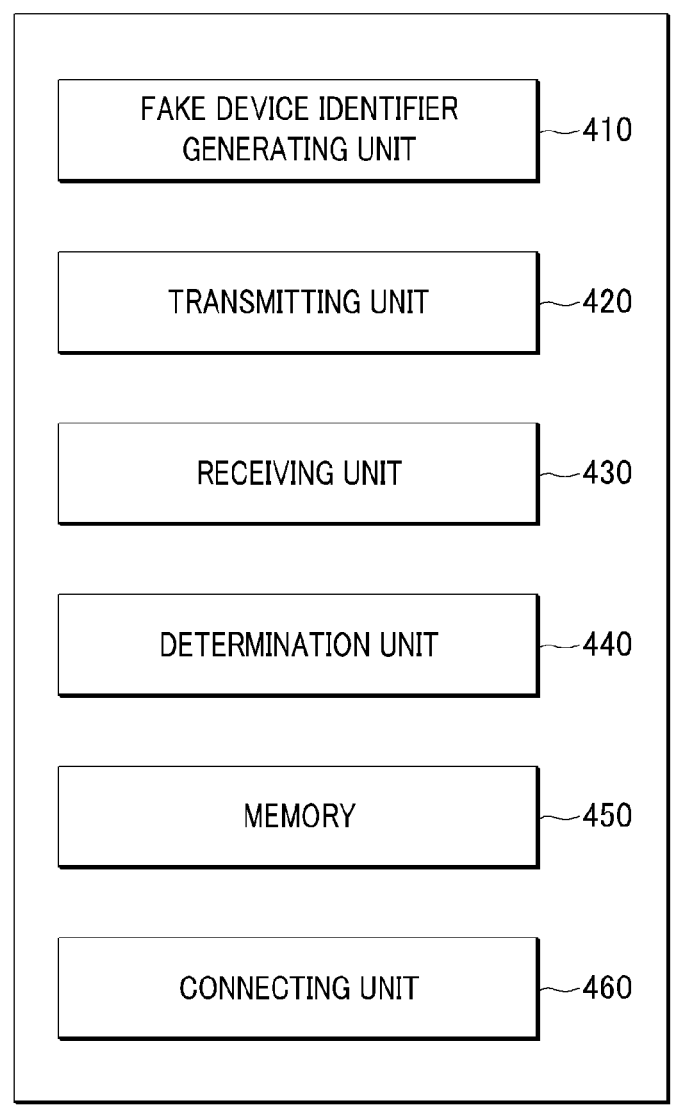
FIG. 4 shows a schematic block diagram illustrating an example architecture for an end device, arranged in accordance with at least some embodiments described herein.

FIG. 4 shows a schematic block diagram illustrating an example architecture for an end device 130, arranged in accordance with at least some embodiments described herein. As depicted in FIG. 4, end device 130 may include a fake device identifier generating unit 410, a transmitting unit 420, a receiving unit 430, a determination unit 440, a memory 450, and a connecting unit 460. Although illustrated as discrete components, various components may be divided into additional components, combined into fewer components, or eliminated altogether while being contemplated within the scope of the disclosed subject matter.

Fake device identifier generating unit 410 may generate a fake device identifier (for example, a fake MAC address) for end device 130. By way of example, but not limitation, the fake device identifier may include a random number and/or a random character.

Transmitting unit 420 may transmit, to access point 120, a probe request frame which may include the fake device identifier generated by fake device identifier generating unit 410.

Receiving unit 430 may receive a probe response frame from access point 120 to which the probe request frame is transmitted. The probe response frame may include information regarding access point 120. By way of example, but not limitation, the information regarding access point 120 may include a MAC address of access point 120 and/or an SSID of access point 120.

In some embodiments, receiving unit 430 may receive a fake device identifier (for example, a fake MAC address) for end device 130 from mobile operating server 110. In such cases, transmitting unit 420 may transmit, to access point 120, a probe request frame that includes the fake device identifier received from mobile operating server 110.

Determination unit 440 may determine whether access point 120, which transmitted the probe response frame to end device 130, is an authenticated access point based at least in part on the information regarding access point 120. In some embodiments, determination unit 440 may compare the information regarding access point 120, which is included in the probe response frame, and information regarding authenticated access points, which is included in authenticated access point list 200 as illustrated in FIG. 2. The information regarding the authenticated access points may include a MAC address and/or an SSID of each of the authenticated access points.

Determination unit 440 may determine whether the information regarding access point 120, which is included in the probe response frame, is included in authenticated access point list 200. If the information regarding access point 120 is included in authenticated access point list 200, end device 130 may recognize access point 120 as an authenticated access point.

Memory 450 may store authenticated access point list 200. In some embodiments, receiving unit 430 may receive authenticated access point list 200 from mobile operating server 110 and memory 450 may store the received authenticated access point list 200. Further, memory 450 may store the fake device identifier which is generated by fake device identifier generating unit 410 or received from mobile operating server 110.

Transmitting unit 420 may transmit a connection request, which includes an authentic device identifier, for end device 130 to access point 120 that is recognized as the authenticated access point by determination unit 440. By way of example, but not limitation, the authentic device identifier may include an original MAC address of end device 130.

Receiving unit 430 may receive an approval of the connection request from access point 120 and connecting unit 460 may connect to a wireless local area network provided by access point 120.

Figure 5:
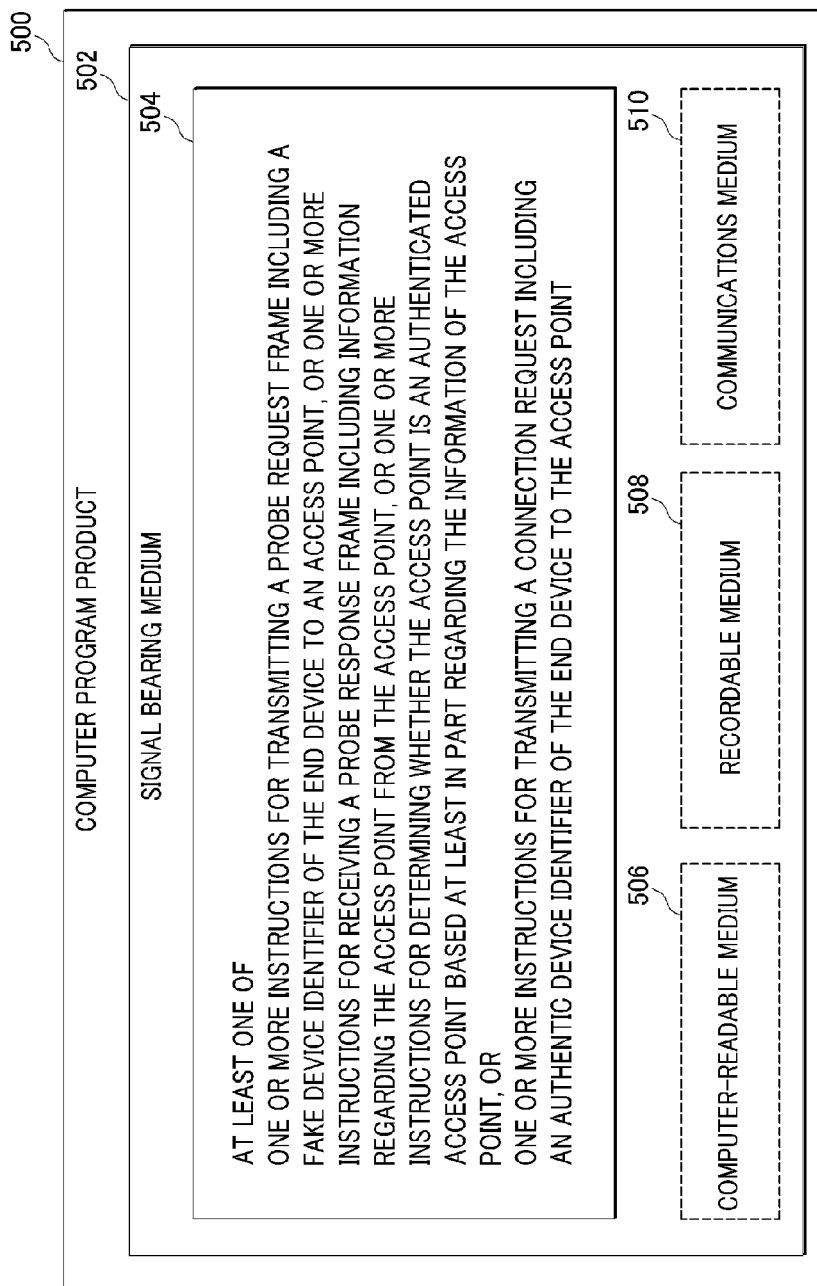
FIG. 5 illustrates a computer program product that may be utilized to provide a scheme for connecting to a wireless local area network, arranged in accordance with at least some embodiments described herein.

FIG. 5 illustrates a computer program product 500 that may be utilized to provide a scheme for connecting to a wireless local area network, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for transmitting a probe request frame including a fake device identifier (for example, a fake MAC address) of the end device to an access point, one or more instructions for receiving a probe response frame including information regarding the access point from the access point, one or more instructions for determining whether the access point is an authenticated access point based at least in part regarding the information regarding the access point, and one or more instructions for transmitting a connection request including an authentic device identifier of the end device to the access point. Thus, for example, referring to FIG. 4, end device 130 may undertake one or more of the blocks shown in FIG. 3 in response to instructions 504.

In some implementations, signal bearing medium 502 may encompass a computer-readable medium 506, such as, but not limited to, a hard disk drive (HDD), a compact disk (CD), a digital versatile disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of mobile operating server 110 by an RF signal bearing medium 502, where the signal bearing medium 502 is conveyed by a wireless communications medium 510 (e.g., a wireless communications medium conforming with the IEEE 802.11 standard).

Figure 6:
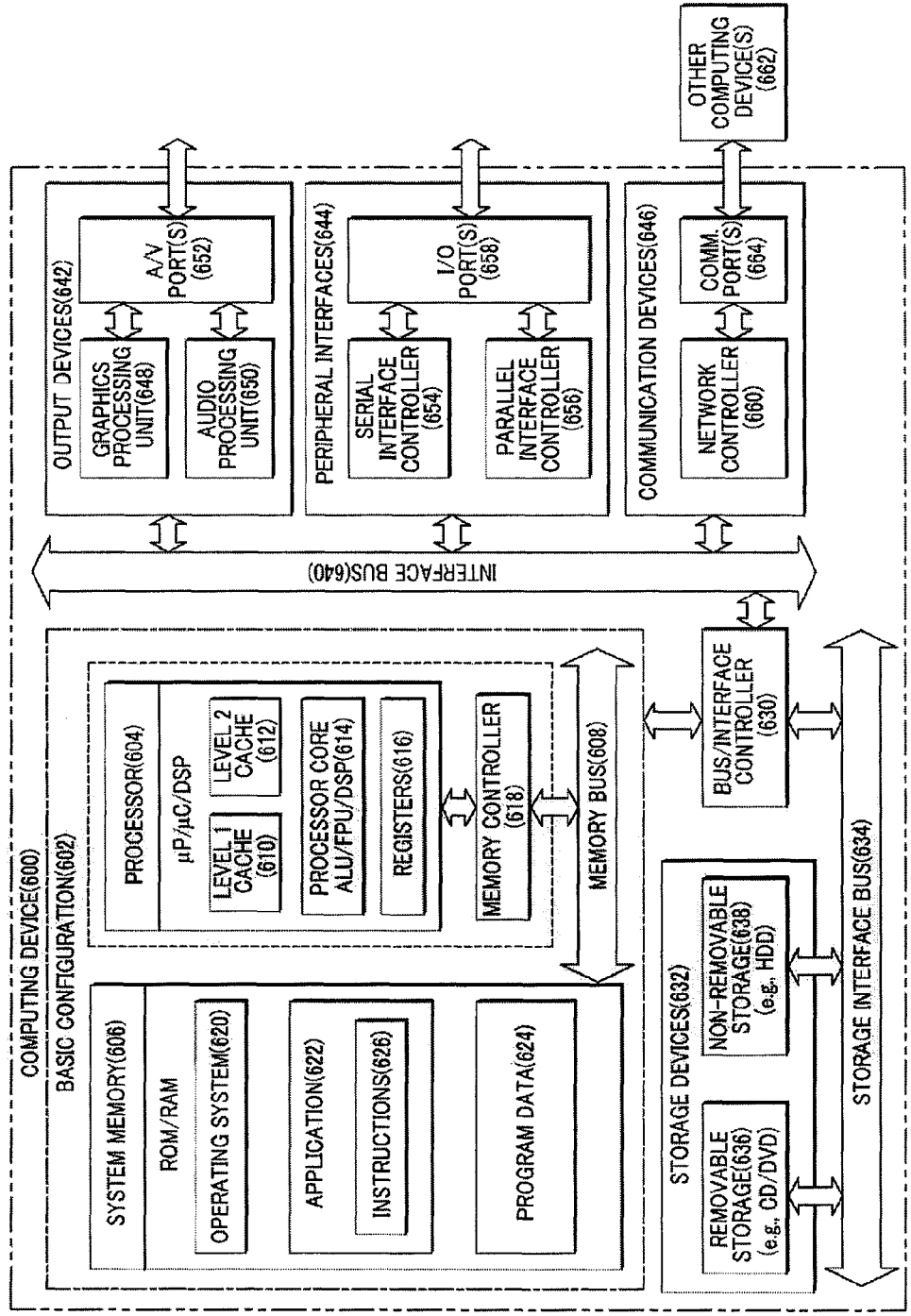
FIG. 6 is a block diagram illustrating an example computing device that may be utilized to provide a scheme for connecting to a wireless local area network, arranged in accordance with at least some embodiments described herein.

FIG. 6 is a block diagram illustrating an example computing device that may be utilized to provide a scheme for connecting to a wireless local area network, arranged in accordance with at least some embodiments described herein. In these examples, elements of computing device 600 may be arranged or configured for a mobile operating server or an end device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller C), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622 (including instructions 626), and program data 624.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an end device, the method comprising:
   receiving a fake device identifier from a mobile operating server;
   transmitting, to an access point, a probe request frame that includes the fake device identifier for the end device;
   receiving, from the access point, a probe response frame that includes information regarding the access point;
   determining that the access point is an authenticated access point based at least in part on the information in the probe response frame that indicates that:
   the access point is controlled by the mobile operating server, and the access point was connected with the end device previous to when the access point received the transmitted probe request frame; and transmitting, to the access point determined to be the authenticated access point, a connection request that includes an authentic device identifier for the end device.

2. The method of claim 1, further comprising:
receiving, from the access point, an approval of the connection request; and
connecting to a wireless local area network provided by the access point.

3. The method of claim 2, wherein the access point includes a Wi-Fi access point, and the wireless local area network provided by the access point includes a Wi-Fi network.

4. The method of claim 1, wherein the receiving the fake device identifier includes receiving at least one of a random number or a random character.

5. The method of claim 1, wherein the authentic device identifier includes a media access control (MAC) address.

6. The method of claim 1, further comprising:
receiving, from the mobile operating server, an authenticated access point list that includes information regarding at least one authenticated access point,
wherein the determining is further based at least in part on the authenticated access point list.

7. The method of claim 6, wherein the information regarding the at least one authenticated access point includes at least one of a media access control (MAC) address or a service set identifier (SSID) of each of the at least one authenticated access point, and
wherein the information regarding the access point includes at least one of a media access control (MAC) address or a service set identifier (SSID) of the access point.

8. An end device, comprising:
a transmitter configured to transmit, to an access point, a probe request frame that includes a fake device identifier;
a receiver configured to receive, from the access point, a probe response frame that includes information regarding the access point;
a memory configured to store an authenticated access point list that includes information regarding at least one authenticated access point;
a determination unit configured to determine that the access point is the at least one authenticated access point based, at least in part, on the information regarding the access point that indicates that:
the access point is controlled by a mobile operating server, and
the access point was connected with the end device previous to when the access point received the probe request frame transmitted from the transmitter; and
a connection unit configured to connect to a wireless local area network provided by the access point,
wherein the receiver is further configured to receive the fake device identifier from the mobile operating server,
wherein the transmitter is further configured to transmit, to the access point, a connection request that includes an authentic device identifier, and
wherein the receiver is further configured to receive, from the access point, an approval of the connection request.

9. The end device of claim 8, wherein the fake device identifier includes at least one of a random number or a random character.

10. The end device of claim 8, wherein the authentic device identifier includes a media access control (MAC) address.

11. The end device of claim 8, wherein the determination unit is further configured to determine that the access point is the at least one authenticated access point based, at least in part, on the information regarding the access point that is included in the authenticated access point list.

12. The end device of claim 8, wherein the information regarding the at least one authenticated access point includes at least one of a media access control (MAC) address or a service set identifier (SSID) for each of the at least one authenticated access point, and
wherein the information regarding the access point includes at least one of a media access control (MAC) address or a service set identifier (SSID) of the access point.

13. The end device of claim 8, wherein the access point includes a Wi-Fi access point, and the wireless local area network provided by the access point includes a Wi-Fi network.

14. A non-transitory computer-readable storage medium having stored thereon computer-executable instructions that, in response to execution, cause an end device to perform or control performance of operations that comprise:
obtain a fake device identifier from a mobile operating server;
transmit, to an access point, a probe request frame that includes the fake device identifier for the end device;
obtain, from the access point, a probe response frame that includes information regarding the access point;
determine that the access point is an authenticated access point based, at least in part, on the information in the probe response frame that indicates that:
the access point is controlled by the mobile operating server, and
the access point was connected with the end device previous to when the access point received the transmitted probe request frame; and
transmit, to the access point determined to be the authenticated access point, a connection request that includes an authentic device identifier of the end device.

15. The non-transitory computer-readable storage medium of claim 14, wherein the operations further comprise:
obtain, from the access point, an approval of the connection request; and
connect to a wireless local area network provided by the access point.

16. The non-transitory computer-readable storage medium of claim 14, wherein the authentic device identifier includes a media access control (MAC) address.

17. The non-transitory computer-readable storage medium of claim 15, wherein the access point includes a Wi-Fi access point, and the wireless local area network provided by the access point includes a Wi-Fi network.

* * * * *